(12) United States Patent  
Garcia-Sinclair et al.

(10) Patent No.: US 6,359,401 B1  
(45) Date of Patent: Mar. 19, 2002

(54) MULTI-PHASE BIPOLAR BRUSHLESS D.C. MOTOR

(76) Inventors: Neil Garcia-Sinclair, 2825 Newport Rd., Alameda, CA (US) 94501-7117; Ki Bong Park, 13441 Chase St., Arleta, CA (US) 91331

( * ) Notice: Subject to any disclaimer, the term of this patent is extended or adjusted under 35 U.S.C. 154(b) by 0 days.

(21) Appl. No.: 09/690,613

(22) Filed: Oct. 16, 2000

(51) Int. Cl.[7] .............................................. H02K 29/10
(52) U.S. Cl. ..................................... 318/254; 318/138
(58) Field of Search ................................ 318/138, 254, 318/293, 294, 439, 700, 720, 721, 722, 724

(56) References Cited

U.S. PATENT DOCUMENTS

| | | | |
|---|---|---|---|
| 4,459,087 A | * 7/1984 | Barge | 318/254 X |
| 4,882,524 A | * 11/1989 | Lee | 318/254 |
| 5,614,799 A | * 3/1997 | Anderson et al. | 318/439 |
| 5,821,660 A | * 10/1998 | Anderson | 318/138 X |
| 5,847,532 A | * 12/1998 | Webster | 318/701 |

* cited by examiner

*Primary Examiner*—Bentsu Ro  
(74) *Attorney, Agent, or Firm*—Kelly Bauersfeld Lowry & Kelley, LLP

(57) ABSTRACT

A multi-phase bipolar brushless D.C. motor having an embedded permanent magnet as a rotor, an armature as a stator and a plurality of windings are sub-wound on the stator in parallel and independently phase-connected. A commutation encoder defining light shielding and light detecting portions is fixedly mounted on a shaft of the rotor to be rotated, and a photo-sensor is coupled operatively thereto and connected with a driving circuit to improve the performance of the motor.

17 Claims, 10 Drawing Sheets

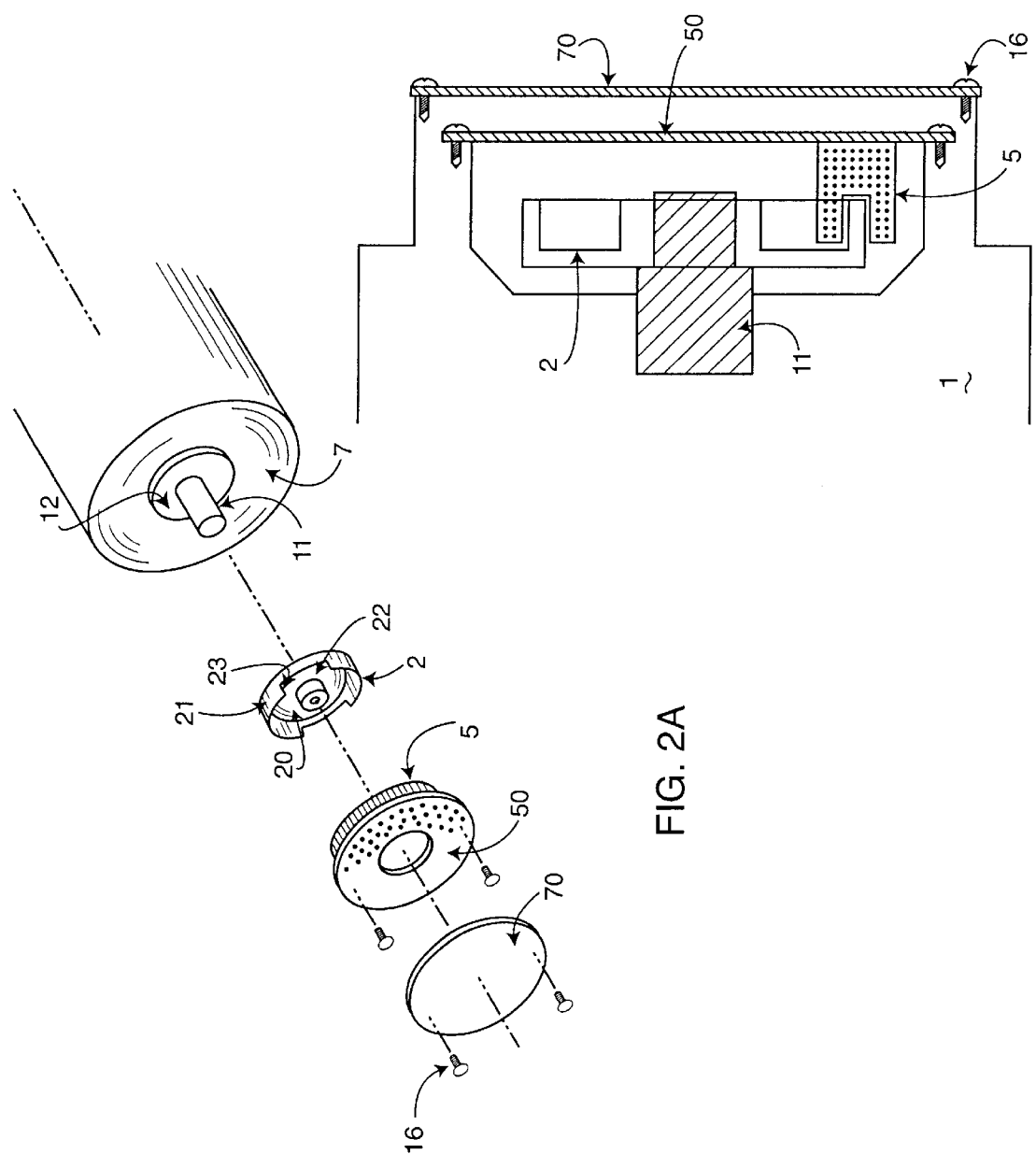

ADJUSTMENT OF ENCODER ANGLE PA1

MULTI-PHASE BIPOLAR BRUSHLESS D.C. MOTOR

BACKGROUND OF THE INVENTION

The present invention relates to direct current (D.C.) motors. More particularly, the present invention relates to a multi-phase bipolar brushless D.C. motor having a stator constituted by an armature, a rotor constituted by embedded permanent magnets, and a plurality of windings connected in parallel resulting in increased efficiency and ease of manufacturing.

In a conventional shunt motor, field coils (exciting coils) are wound on the rotor in order to have the proper number of poles. Coils attaching the brushes to the rotor are wound on the rotor so that as the rotor is rotated energy or power is produced. However, these motors present certain drawbacks. For example, alien substances such as dust can become lodged between commutator segments or the brush. These components must be replaced due to the contact with the dust and the breakdown of insulation or the wear thereof within the motor.

U.S. Pat. No. 4,882,524 discloses a multi-phase bipolar brushless D.C. motor using stator windings sub-wound in series, an encoder wheel having angled slot edges, and a photosensor moved within the slot for adjusting timing to overcome drawbacks of existing D.C. motors. The '524 patent called for the use of whole phase reduction for commutation timing such that "M" phases would be activated "M−1/M" percent of the time. However, this motor had problems associated with current spikes and poor conductance during commutation, resulting in poor power production. The motor also was difficult to manufacture.

Accordingly, what is needed is an improved brushless D.C. motor of improved performance which is easier and less expensive to manufacture than prior motors. The present invention fulfills these needs and provides other related advantages.

SUMMARY OF THE INVENTION

The present invention resides in a multi-phase bipolar brushless D.C. motor in which the embedded permanent magnet is used for the rotor, the winding is wound on the stator as the independent winding and subwound in parallel, the commutation encoder is fixed on the shaft of the rotor to be rotated and has a rectangular cut out of the annular ring which can be varied to control commutation interval, and the photo-sensor is coupled operatively thereto to be connected with the driving circuit. Such a motor is smoothly started and rotated with high torque at low speed and high power at high speed with a simple construction and low cost of manufacture.

More particularly, the stator is constituted by M phases, each phase having a plurality of windings which are connected in parallel and being connected independently of the winding connection of the other phases. The rotor is rotatably coupled to the stator and has "N" embedded permanent magnet poles. A commutation encoder is fixed at one end of the rotor shaft outside the motor and is generally cylindrical in form. The commutation encoder comprises a circular plate and an annular ring, the annular ring having light shielding portions and light detecting portions, each light detecting portion has opposite vertical edges. The light shielding and light detecting portions function, respectively, as the non-sensing and sensing area. A photo-sensor is coupled operatively with the commutation encoder and is constituted so that two photo-transistors are provided with respect to each phase. Each photo-transistor is arranged in M phases, in turn, one by one at intervals of predetermined shaft angle so as to produce a positive pulse when registered with the sensing area of the commutation encoder. An electronic commutator is constituted in such a manner that four power transistors are connected across the winding coil of each phase of the stator. Two of the transistors of each phase are connected to one photo-transistor of the photo-sensor so that each phase is provided with two photo-transistors so as to perform the determination of the current direction according to the positive pulse of the photo-transistors, thereby flowing the alternating current through the winding coil to drive the motor. Finally, an electric power source is connected in parallel to each phase of said electronic commutator.

If in this motor the stator winding is arranged as the lap winding, the motor produces the sinusoidal torque ripples thereby to be adapted for the micro-motor. If instead the stator winding is arranged as the wave winding, the motor produces the trapezoidal torque ripples to be adapted for the power motor.

The present invention is devised to be made into a bipolar system so that the copper loss of the exciting coil can be minimized, thereby increasing the efficiency, and to make into polyphase so that the utility of the coil can be increased, thereby making the compact design of the motor possible and improving the torque ripple. Also in this motor the commutation system comprises a commutation encoder, a photo-sensor and a electronic commutator which are simply and safely constituted so that the starting and rotation characteristics of the motor can be improved. The motor is smoothly started and rotated, with high torque at low speed and high power at high speed. The simple construction of the motor also reduces the cost of production.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 2A is an exploded perspective view of a motor having a commutation encoder and a photo-sensor in accordance with the present invention;

FIG. 2B is a cross-sectional view of the motor of FIG. 2A

DETAILED DESCRIPTION OF THE PREFERRED EMBODIMENT

Figure 1:
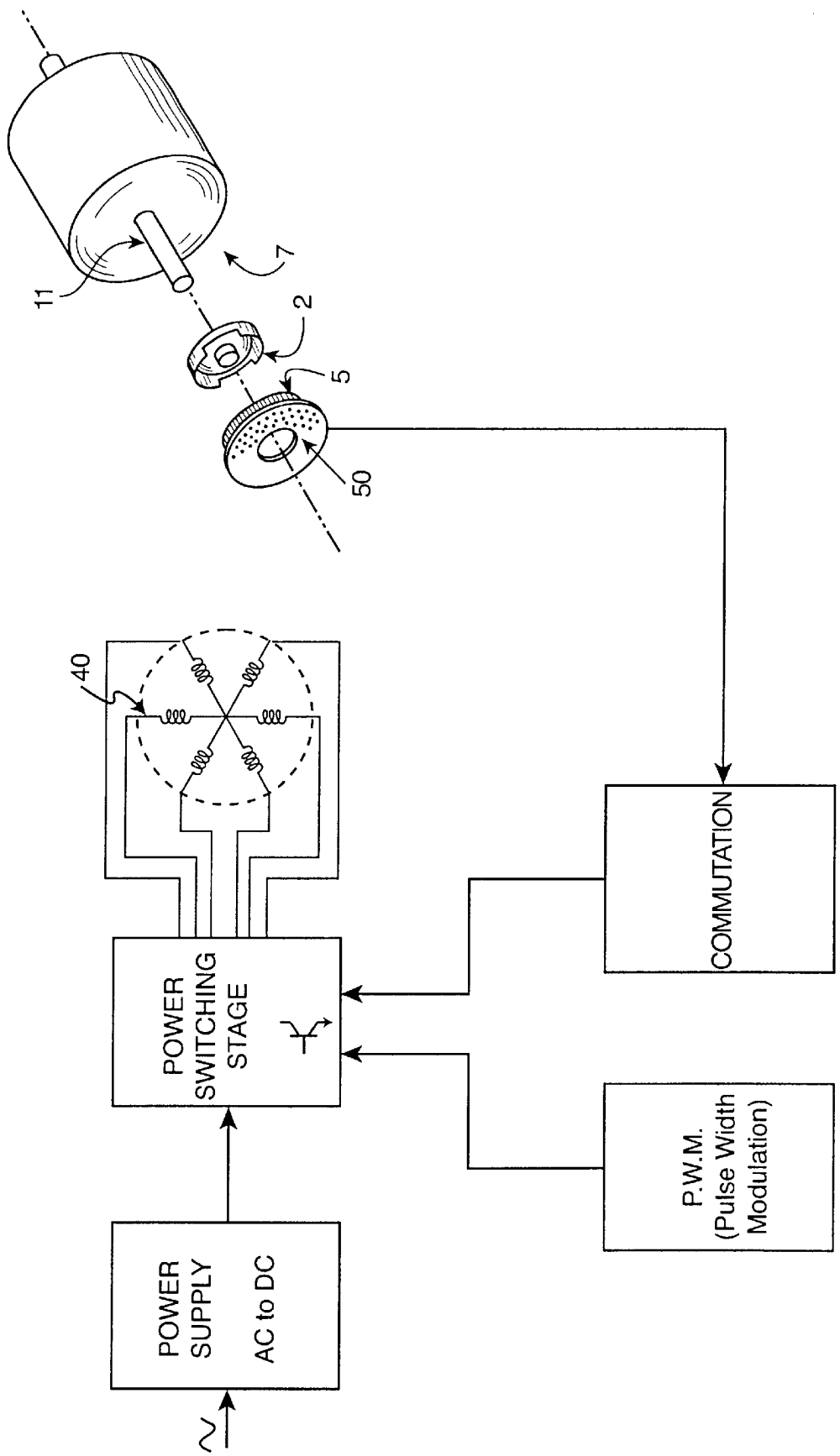
FIG. 1 is a schematic diagram showing, partly in block form, a system of a multi-phase bipolar brushless D.C. motor embodying the present invention.

As shown in the drawings for purposes of illustration, the present invention relates to a multi-phase bipolar brushless D.C. motor. It should be noted that, for a facile description, the following explanation of the present invention will be made with reference to a 3-phase 4-pole brushless D.C. motor which is illustrated, by way of example only, in the accompanying drawings.

Referring now to FIGS. 1–2B, there is illustrated, partially in block form in FIG. 1, a system of a 3-phase 4-pole brush less D.C. motor according to the present invention. The 3-phase 4-pole brushless D.C. motor includes a rotary machine 1 having a stator 4 constituted by three phases A, B and C, each phase having four windings 40 which are connected in parallel. Each phase is connected in parallel to a voltage controller, directly in the case of a direct current power supply, and through a direct current rectifier in the case of an alternating current supply so that the motor is composed efficiently.

The rotary machine 1 also has a rotor 7 constituted by one or more embedded permanent magnets 8, making the rotor having better flux concentration. A rotor shaft 11 of the rotary machine 1 is projected outwardly from a bracket 12 which is fixed on one end of the rotary machine 1. A commutation encoder 2 is fixed along the length of the rotor shaft 11 towards one end thereof by means of a screw 16 and washer or like means so that the commutation encoder 2 can be rotated together with the rotor shaft 11. With reference to FIGS. 2A and 2B, the commutation encoder 2 assumes a generally cylindrical form having a circular plate 19 and an annular ring 20. The annular ring 20 comprises light shielding portions 21 and light detecting portions 22 which function as the non-sensing areas and the sensing areas, respectively.

The PCB board 50 supports a photo-sensor 5 which produces a positive pulse when registered with the sensing area of the commutation encoder 2. The photo-sensor 5 typically assumes a U-shaped form having a guide groove 59 for receiving and guiding the annular ring 20 of the commutation encoder 2. A cover plate 70 may encase the above-described components as deemed necessary.

Figure 3B:
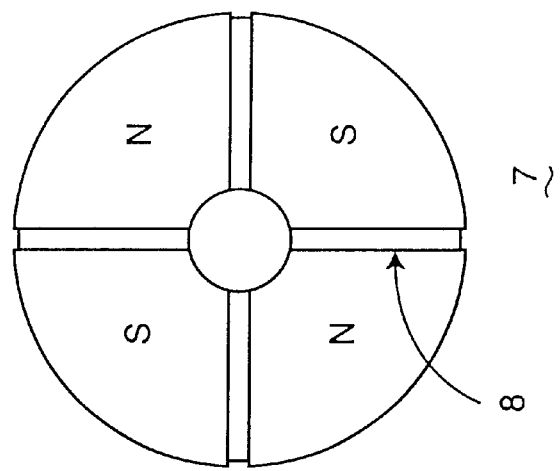
FIG. 3B is a schematic view illustrating an arrangement of the 4-pole rotor embedded permanent magnets of FIG. 3A.
Figure 3A:
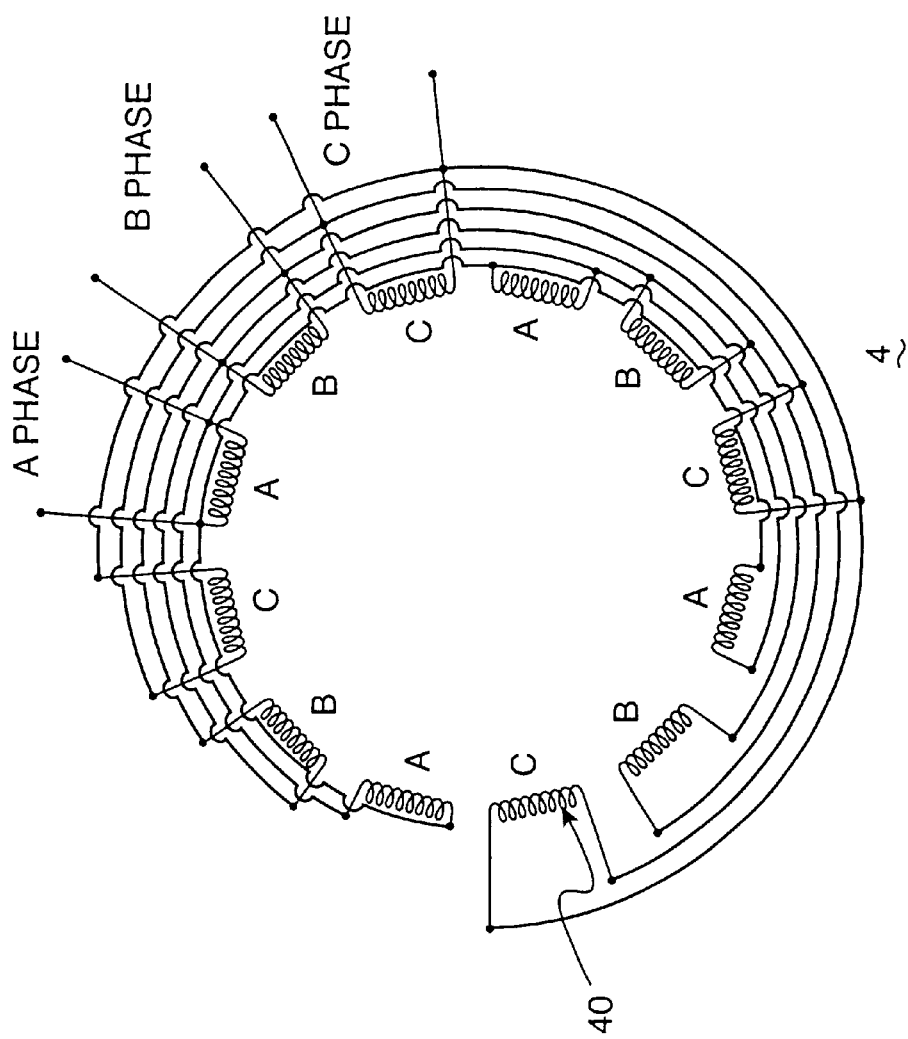
FIG. 3A is a schematic diagram illustrating a circular independent winding of coils of a 3-phase 4-pole motor.
Figure 3C:
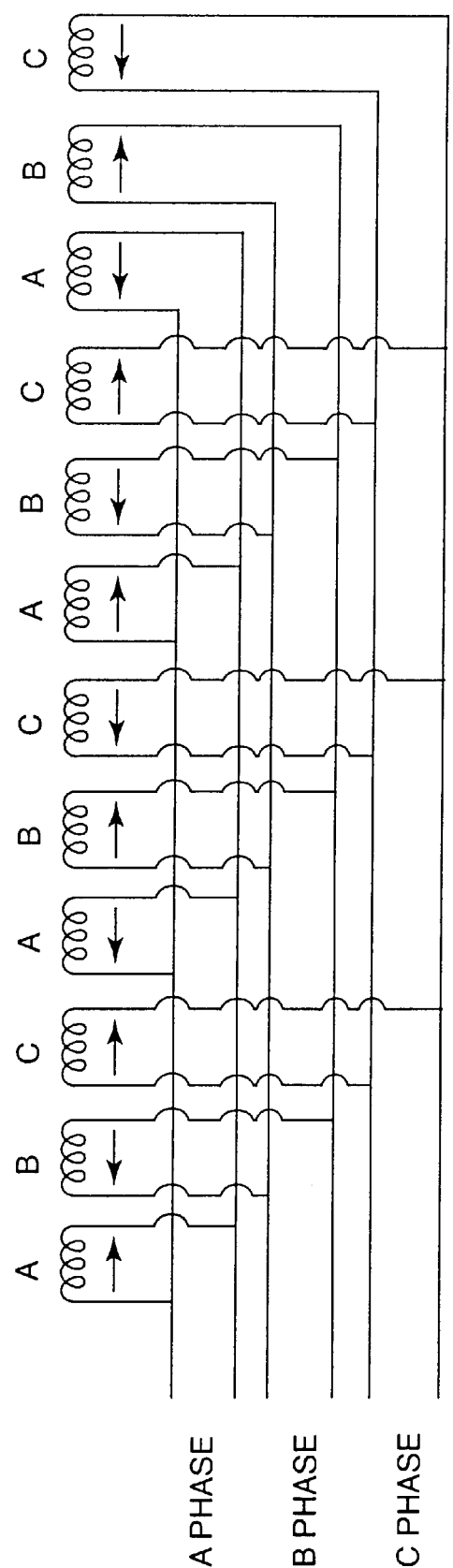
FIG. 3C is a schematic view of a parallel-developed independent connecting winding coils of the 3-phase 4-pole motor of FIG. 3A.

Referring now to FIGS. 3A–3C, the windings 40 of each phase of the stator 4 are connected independently of the winding connection of the other phases. A circular independent connecting diagram of the 3-phase 4-pole motor illustrates this configuration in FIG. 3A, and a parallel developed independent connecting diagram of the winding coils is shown in FIG. 3C. The winding coil ends of each phase of the stator 4 are connected to transistors of each corresponding phase of an electronic commutator, as will be described more fully herein. Thus, since the stator 4 assumes the independent phase-connected winding form connected differently from the Δ connected, or Y-connected winding form, the motor is constituted so that the exciting condition of the winding coil of each phase is always constant, even though the motor becomes a polyphase motor.

As shown in FIG. 3B, the rotor 7 is constituted as four embedded magnetic poles. It is understood that the stator 4 can be constituted as two, three, . . . M phases and the rotor 7 can be constituted as one, two, four, six, eight, . . . or 2n poles. Hence, the number of poles can be easily increased, or reduced as occasion demands, and the length, the thickness, or the shape of the rotary machine 1 can be easily modified as occasion demands.

Each of the light detecting portions 22 of the annular ring 20 has opposite vertical portions 23 so as to modulate the exciting width by adjusting the width of the light sensing portion of the annular ring 20. The number of the light detecting portions 22, i.e., the sensing areas is determined by the following formula: the number of poles in the rotor/2.

Figure 5:
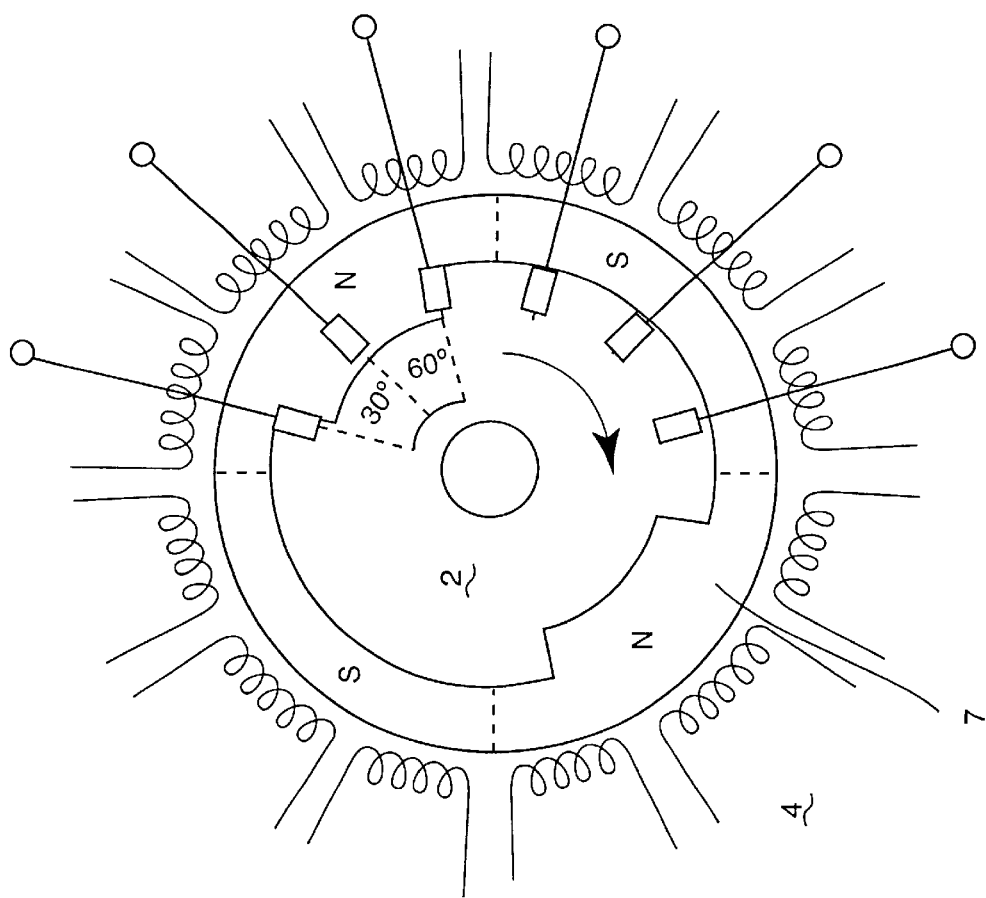
FIG. 5 is a schematic representation of a construction of the 3-phase 4-pole motor.

Accordingly, the number of the sensing areas of the preferred 3-phase 4-pole motor corresponds to two. Also, the width of the sensing area corresponds to the shaft angle determined by the following formula: $2\pi/$ the number of poles×(the number of phases×K/ the number of phases), where k is the commutation coefficient. Hence, the width of the sensing area of the preferred 3-phase 4-pole motor corresponds to the shaft angle of 60°, as shown in FIG. 5, where k=0.67. The commutation coefficient is determined experimentally and differs depending on N, M, lamination shape, magnetic strength, airgap and overall motor shape.

Figure 4B:
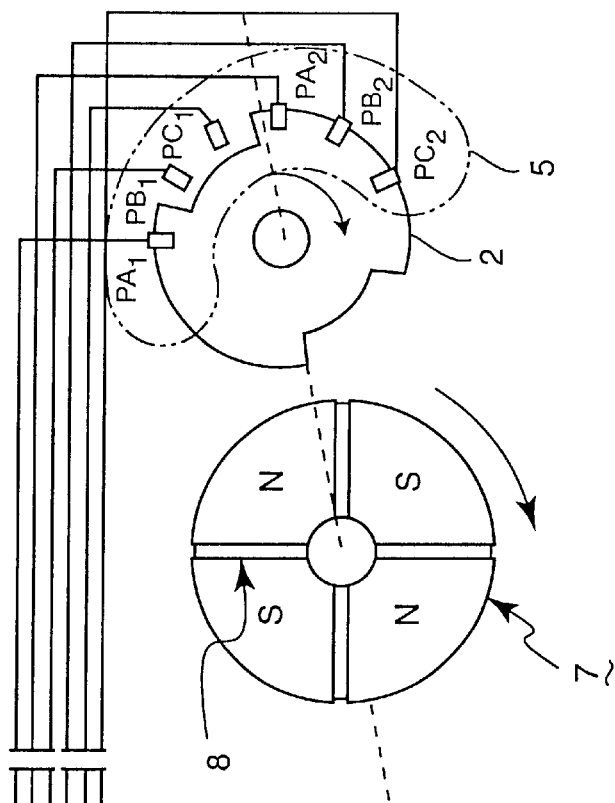
FIG. 4B is a schematic representation of the constructions of the 4-pole rotor embedded permanent magnets, the commutation encoder and the photo-sensor in accordance with the present invention.
Figure 4A:
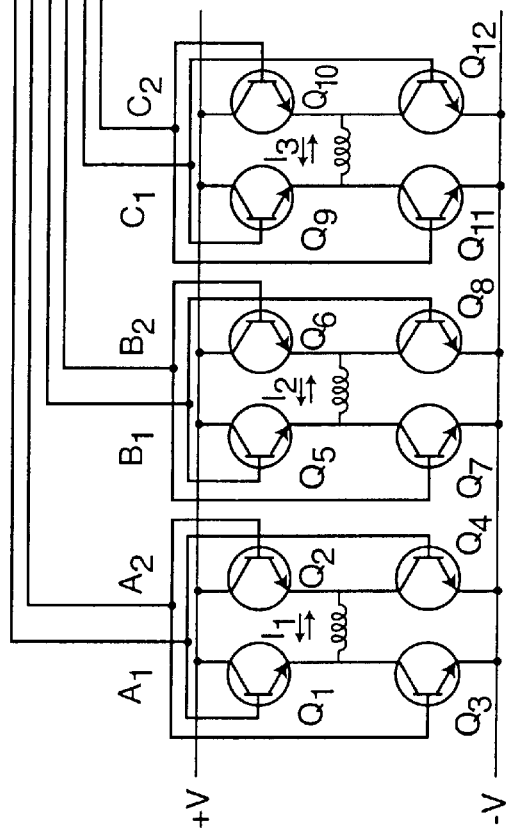
FIG. 4A is a schematic representation of a driving circuit in accordance with the present invention.

Referring now to FIGS. 4A and 4B, there is illustrated a driving circuit having the commutation system comprising the commutation encoder 2, the photo-sensor 5, and the electronic commutator in accordance with the present invention. The electronic commutator is constituted in such a manner that four power transistors are connected across the winding coil of each phase of the stator 4. Two of transistors connected across the winding coil of each phase are connected to one photo-transistor of the photo-sensor 5 so that each phase is provided with two photo-transistors, thereby performing the determination of the current direction according to the operation of the photo-transistors.

For example, one photo-transistor $PA_1$ of A-phase of the photo-sensor 5 is connected to the transistors $Q_1$ and $Q_4$ so that, when the photo-transistor $PA_1$ is turned on, the transistors $Q_1$ and $Q_4$ are turned on to allow the current to be flowed from the transistor $Q_1$ to the transistor $Q_4$. The other photo-transistor $PA_2$ of A-phase is connected to the transistor $Q_2$ and $Q_3$ so that, when the photo-transistor $PA_2$ is turned on, the transistors $Q_2$ and $Q_3$ are turned on to allow the current to be flow from the transistor $Q_2$ to the transistor $Q_3$. The photo-transistors in B- and C-phase are connected to the transistors in the same way as the photo-transistors in the described A-phase.

Therefore, the commutation system of the present invention is independently arranged in every phase. Thus, as two photo-transistors are provided with respect to one phase so that only the positive pulse in used, the pulse dividing device common in prior art systems can be removed.

As shown in FIGS. 4B and 5, the photo-sensor 5 is constituted by six photo-transistors $PA_1$, $PB_1$, $PC_1$, $PA_2$, $PB_2$ and $PC_2$ so that two photo-transistors are provided with respect to each phase. Each of photo-transistors $PA_1$, $PB_1$, $PC_1$ $PA_2$, $PB_2$ and $PC_2$ in A-, B-, and C-phase is arranged, in turn, one by one at intervals of the shaft angle calculated by the following formula: $2\pi/$(the number of poles×the number of phases). Accordingly, the interval between each photo-transistor of the preferred 3-phase 4-pole motor corresponds to the shaft angle of 30°.

The interval between two photo-transistors of each phase is determined by the following formula: $2\pi/$the number of poles. Therefore, the interval between two photo-transistors $PA_1$ and $PA_2$ of A-phase corresponds to the shaft angle of 90°. The B- and C-phases are determined in the same fashion as the A-phase.

In the brushless D.C. motor constructed thus, the number of photo-transistors which can be turned on simultaneously within one sensing area corresponds to the number of phases minus one. Accordingly, the commutation encoder 2 and photo-transistors according to the present invention becomes: 2-phase 1-exciting, 3-phase 2-exciting, 4-phase 3-exciting, 5-phase 4-exciting, 6-phase 5-exciting . . . ; so that a n-phase (n−1)-exciting motor is constructed, thereby performing the production of the multiphase bipolar brushless D.C. motor.

Figure 8A:
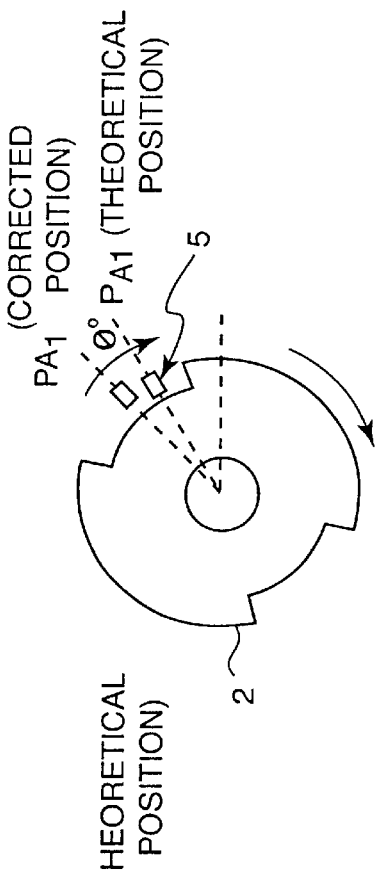
FIG. 8A is a representation of a corrected position of the photo-transistor.
Figure 7A:
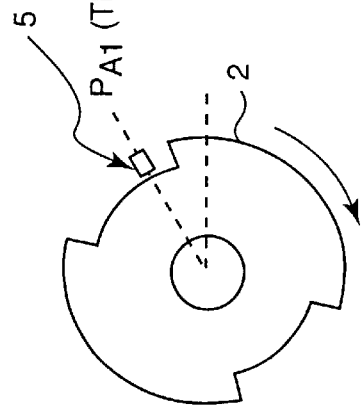
FIG. 7A is a representation of a theoretical position of a photo-transistor.
Figure 8B:
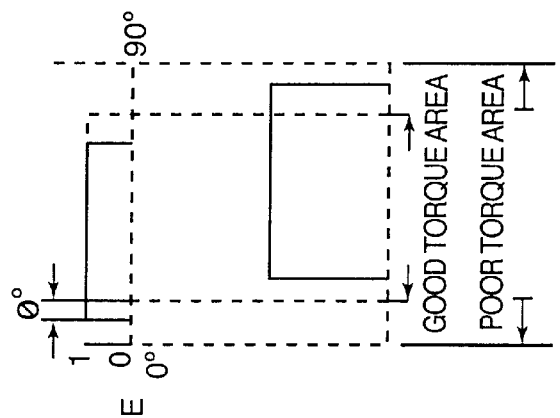
FIG. 8B is a representation of the waveform of the voltage input resulting from the corrected position of FIG. 8A.
Figure 7B:
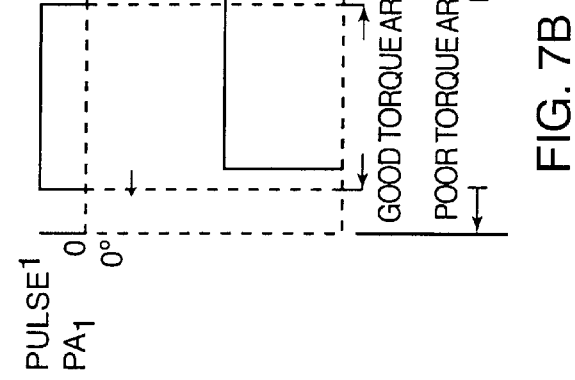
FIG. 7B is a representation of the waveform of the voltage input resulting from the theoretical position of FIG. 7A.

Referring now to FIGS. 7–8, in order to improve the efficiency and minimize the copper loss, it is preferred for the photo-transistors of the photo-sensor 5 be set in the advanced commutation by "θ°" as the best position with the motor in driving mode. If the photo-transistor (only one shown) is registered with the theoretical sensing position of the sensing area of the commutation encoder 2 during the driving of the motor, the photo-transistor will generate a positive pulse so that the transistor of the electronic commutator is "ON", causing a current to flow in a given direction of the winding coil. Then, when the photo-transistor is registered with the non-sensing area of the commutation encoder 2 by the rotation of the commutation encoder 2, the photo-transistor stops the generation of the positive pulse to allow the transistors to be turned "OFF", thereby cutting off the current in the winding coil. The position of maximum torque, efficiency, and power can be shown to be at an advanced position due to optimizing the force vectors of torque production in this type of motor. Accordingly, it is necessary to eliminate the portion of poor torque by the advanced commutation of the photo-transistor with the reverse direction to the rotating direction of the rotor 7. This advanced commutation of the photo-transistor of the photo-sensor 5 can be easily adjusted because the photo-transistor is disposed on the rotor shaft 11 outside the rotary machine 1.

The photo-sensor 5 position of every other photo-transistor in the rotational sequence can be moved rotationally to another pole of the magnet having the same polarity at approximately the same location as the original pole according to the formula: $4\pi/$(the number of poles), when the motor has insufficient area to properly position all of the photo-sensors.

Figure 10A:
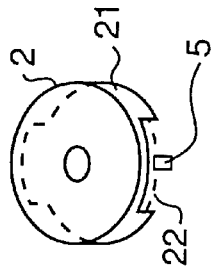
FIG. 10A is a representation of a state where the photo-transistor is attached to the optimally corrected angle on the commutation encoder.
Figure 10B:
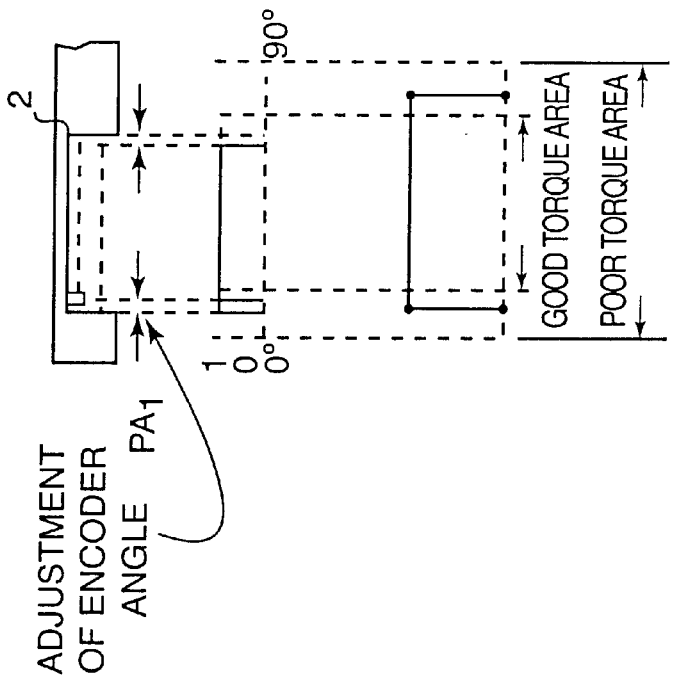
FIG. 10B is a representation of the waveform of voltage input resulting from the optimally corrected position of FIG. 10A.
Figure 9A:
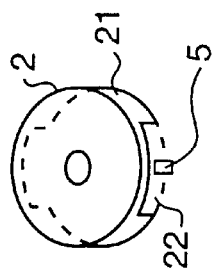
FIG. 9A is a representation of the photo-transistor being attached at the corrected angle to the commutation encoder.
Figure 9B:
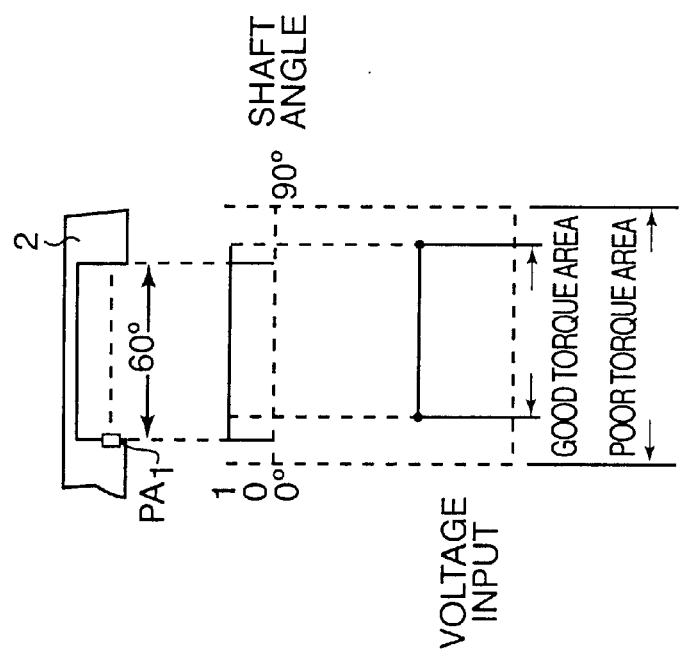
FIG. 9B is a representation of the waveform of voltage input resulting from the corrected angle of FIG. 9A.

With reference to FIGS. 9 and 10, the width of the sensing area for the photo-sensor 5 can be slightly changed to modulate the exciting width in the winding coil, as determined to be necessary. For example, in the case that photo-transistors of the photo-sensor 5 are positioned in the position which the sensing area therefore corresponds to the shaft angle of 60°, the winding coil will result in the exciting in the area of poor torque. The exciting in the area of poor torque makes the iron loss of the stator increased, which results in generating heat in the motor which degrades the efficiency of the motor. To eliminate these drawbacks, it is necessary to change the width of the sensing area for the photo-transistor having an effect on the exciting width in the winding coil. This is accomplished by changing the angle between the edges of the light detecting portion. This adjustment can be more easily performed by using an encoder with a different width. It is preferred for the adjustment of the angle between the edges of the light detecting portions of the encoder to be set in the best position of torque and in the most efficient position of the motor in operation. Thus, the commutation encoder 2 of the invention makes it possible to maximize the efficiency of the motor by adjusting the angle between edges of the light detecting portions 22.

Figure 11:
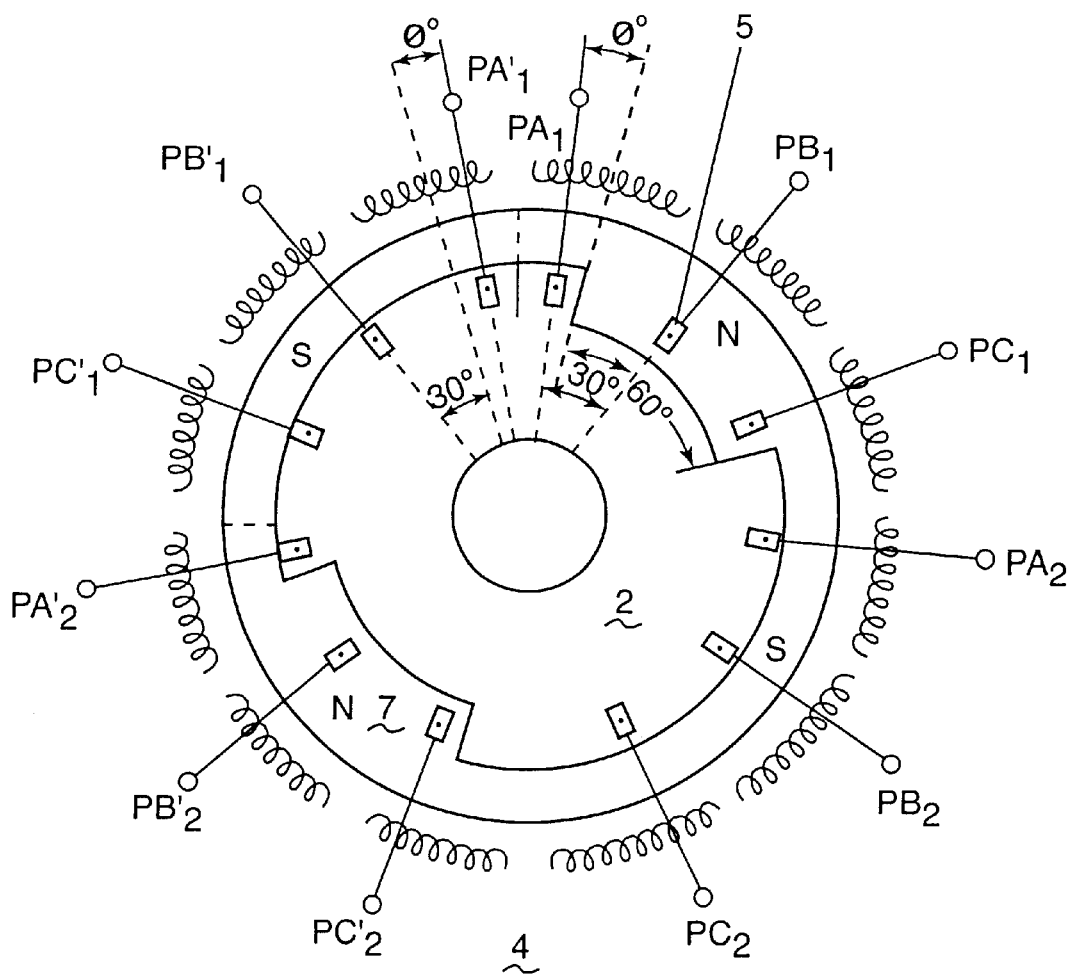
FIG. 11 is a schematic view showing an arrangement of the sets of photo-transistors for use in the forward and reverse rotation in the 3-phase 4-pole motor in accordance with the present invention.

The photo-sensor 5 of the 3-phase 4-pole brushless D.C. motor according to the present invention, and as shown in FIG. 11, can be constructed to rotate forwardly or reversely by providing the set of photo-transistors $PA'_1$, -$PC'_2$ for use in the reverse rotation in the symmetric position separated from the set of photo-transistors $PA_1$–$PC_2$ for use in the forward rotation advancedly positioned by "θ°" from the theoretical sensing position of photo-transistor. In accordance with the selection of the set of the photo-transistors for use in the forward or reverse rotation by non-contacted electromagnetic operation, the forward, or reverse rotation of the motor is possible.

Figure 6:
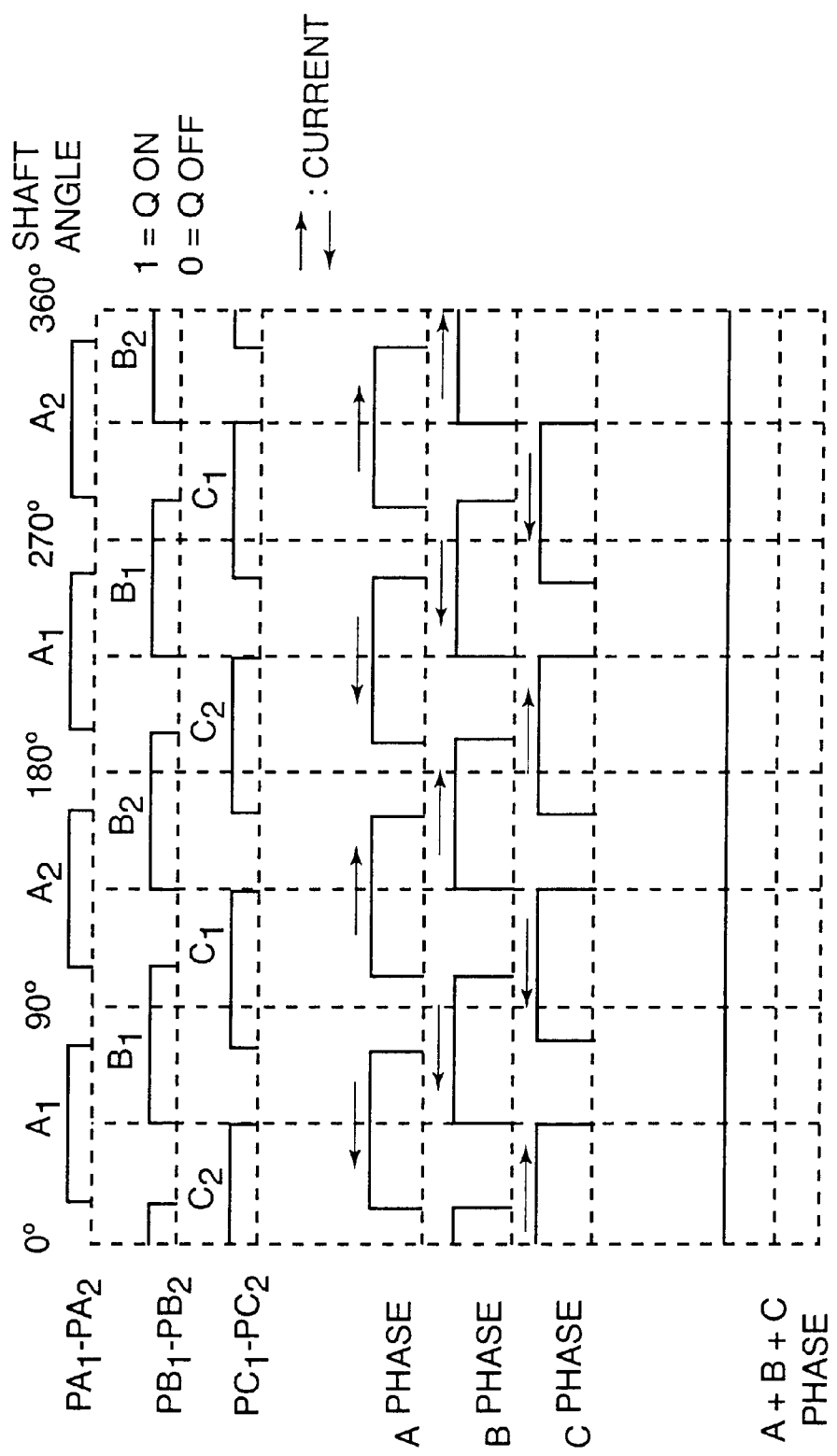
FIG. 6 is a diagram illustrating waveforms of the output of FIGS. 3A, 3B and 3C.

The operation of the preferred 3-phase 4-pole brushless D.C. motor according to the present invention will now be described. The power source is turned on to energize the commutation system of the drive circuit. Each of photo-transistors $PA_1$, $PB_1$, $PC_1$, $PA_2$, $PB_2$ and $PC_2$ of the photo-sensor 5 is registered with one sensing area of the commutation encoder 2 in order to produce the positioning pulse and supply the produced positive pulse to the electronic commutator to allow the transistors $Q_1$–$Q_{12}$ of the electronic commutator to be turned on, thereby allowing bipolar, partial square wave current flow through the winding coil of each phase as shown in FIG. 6. Namely, when the photo-transistors $PA_1$ and $PB_1$ of A- and B-phases are within the sensing area of the commutation encoder 2, both the photo-transistors $PA_1$ and $PB_1$ produce the positive pulse.

Then, the transistors $Q_1$ and $Q_4$, and $Q_5$ $Q_8$ in A- and B-phases are turned on so that the current of each phase flows, respectively, from the transistor $Q_1$ to $Q_4$ and from the transistor $Q_5$ to $Q_8$ so as to allow the corresponding alternating current of the square wave to be flowed through the winding coil of A- and B-phases, thereby driving the motor.

In this case, since the width of the sensing area for the photo-transistor producing the positive pulse to transmit to the electronic commutator corresponds to the shaft angle of 60°, the photo-transistor $PC_1$, $PC_2$, and $PA_2$ and $PB_2$, spaced respectively by the shaft angle of 90° away from the photo-transistors $PA_1$ and $PB_1$, are turned off. While the rotor 7 is rotated by the shaft angle of 30° upon alternating, the photo-transistor $PA_1$ is turned off, as shown in FIG. 4B. Then, the photo-transistor $PC_1$ is newly positioned in the sensing area of the commutation encoder 2 to produce the positive pulse. Accordingly, the transistors $Q_5$ and $Q_8$, and $Q_9$ and $Q_{12}$ in B- and C-phases are maintained in an "on" state so that the current of each phase flows, respectively, from the transistor $Q_5$ to $Q_8$ and from the transistor $Q_9$ to $Q_{12}$ so as to allow the corresponding alternating current of the square wave to be flowed through the winding coil of B- and C-phases, thereby driving the motor. In this case, the photo-transistors $PA_1$, $PA_2$, $PB_2$ and $PC_2$ are turned off, by reason as above-mentioned.

While the rotor 7 is again rotated by the shaft angle of 30°. upon the alternating, the photo-transistor $PB_1$ is turned off. Then, the photo-transistor $PA_2$ is newly positioned in the sensing area of the commutation encoder 2 to produce the positive pulse. Accordingly, the transistors $Q_9$ and $Q_{12}$, and $Q_2$ and $Q_3$ in C- and A-phases are maintained in an "on" state so that the current of each phase flows, respectively, from the transistor $Q_9$ to $Q_{12}$ and transistor $Q_2$ to $Q_3$ so as to allow the corresponding alternating current of the square wave to be flowed through the winding coil of C- and A-phases, thereby driving the motor. In this case, the photo-transistor $PA_1$, $PB_1$, $PB_2$ and $PC_2$ are at the position where it cannot be turned on, by reason as mentioned above. Thus, the operation of the photo-sensor 5 and electronic commutator of the commutation system is repeated to drive the motor.

Accordingly, the brushless D.C. motor according to the present invention is smoothly rotated.

From the above description, it will be readily seen that the brushless D.C. motor of this invention is constructed so that a pair of photo-transistors per phase are arranged in the commutation encoder 2 so as to eliminate the signal dividing device thereby enabling the circuit to be simplified. Moreover, the brushless D.C. motor of the invention is constituted so that the maximum current can be applied to the independent and parallel winding coil for each phase, and the winding coils are utilized efficiently so as to realize a compact design. Furthermore, the brushless D.C. motor of the invention allows a torque ripple to be remarkably improved, and the iron loss to be minimized by eliminating the portion having the poor torque by the advanced commutation of the photo-transistors and the adjustment of the width of the sensing area for the photo-transistor so that the heat generated from the motor is minimized with improving the efficiency. Further, the brushless D.C. motor of the invention can be constructed to rotate forwardly or reversely by providing the set of photo-transistors used during the reverse rotation in the symmetric position separated from the set of photo-transistors used during the forward rotation. Also, the reduction of the captivity of the transistor mounted in the driving edge having independent phases makes the manufacturing cost reduced.

Although an embodiment has been described in detail for purposes of illustration, various modifications may be made without departing from the scope and spirit of the invention. Accordingly, the invention is not to be limited, except as by the appended claims.

What is claimed is:

1. A multi-phase bipolar brushless D.C. motor comprising: a stator constituted by M phases, each phase having a plurality of windings connected in parallel and further connected independently of the winding connection of the other phases;

a rotor shaft rotatably coupled to said stator and having N embedded permanent magnet poles which concentrate flux between opposing faces of like polarity;

a commutation encoder fixed at one end of the rotor shaft comprising a circular plate and an annular ring defining at least one light shielding portion which functions as a non-sensing area, and at least one light detecting portion having opposite vertical edges which functions as a sensing area;

photo-sensors coupled operatively with the commutation encoder and being constituted so that two photo-transistors are provided with respect to each phase, each of the photo-transistors in the M phases being arranged, in turn, and one by one at intervals of predetermined shaft angle so as to produce a positive pulse when registered with the sensing area of the commutation encoder;

an electronic commutator constituted in such a manner that four power transistors are connected across the windings of each phase of the stator, two of the four power transistors of each phase being connected to one of the photo-transistors so that each phase is provided with two photo-transistors in order to perform the determination of the current direction according to the positive pulse of the photo-transistors, thereby flowing the alternating current through the windings to drive the motor; and an electric power source connected in parallel to each phase of said electronic commutator;

wherein the width of the light detecting potion is determined by the following formula:

$2\pi/$ the number of poles×(the number of phases×K/the number of phases), wherein K is the commutation coefficient;

the number of the light detecting portions is determined by the following formula:

(the number of poles)/2; and the interval between each of the photo-transistors is determined by the following formula:

$2\pi/$(the number of poles)×1/(the number of phases);

whereby the motor can be composed of one selected from a group consisting of 2-phase with 1-x-exciting, 3-phase with 2-y-exciting, 4-phase with 3-z-exciting ... n-phase with (n–1–j)-exciting, where x, y, z and j are fractional commutation coefficients, thereby raising the efficiency, power, and speed of the motor.

2. The motor of claim 1, wherein the photo-sensor position of every other photo-sensor in the rotational sequence is moved rotationally to another pole of the same polarity at the same location in that pole as the original pole according to the formula: $4/\pi$(the number of poles), when the motor has insufficient area to properly position all of the photo-sensors.

3. The motor of claim 1, wherein the photo-sensors are arranged in a form of advanced commutation by a given angle in the direction adverse to the rotational direction of the commutation encoder from theoretical position to improve the performance of the motor.

4. The motor of claim 1, wherein the photo-sensor is coupled operatively with the commutation encoder in such a manner that, as occasion demands, the width between the light sensing portion can be adjusted in order to slightly change the width of the sensing area of the light detecting portion in order to modulate the exciting width of the windings and produce a bipolar partial square waveform.

5. The motor of claim 1, wherein the photo-sensor includes a set of photo-transistors for use in a reverse rotation which set is provided in symmetric position separated from the two photo-transistors for use in forward rotation.

6. The motor of claim 1, wherein the N permanent magnet poles are formed by embedded magnets.

7. The motor of claim 1, wherein the commutation encoder is fixed to the rotor shaft outside of the motor and is of cylindrical configuration.

8. A multi-phase bipolar brushless D.C. motor, comprising:

a stator defining M phases, having a plurality of windings connected in parallel and independently of the winding connection of the other phases;

a rotor shaft rotatably coupled to said stator and having N permanent magnet poles for concentrating flux between opposing faces of like polarity;

a commutation encoder at one end of the rotor shaft defining at least one light shielding portion which functions as a non-sensing area, and at least one light detecting portion which functions as a sensing area;

photo-sensors corresponding to each phase and coupled operatively with the commutation encoder, the photo-transistors being arranged so as to produce a positive pulse when registered with the sensing area of the commutation encoder;

an electronic commutator including power transistors connected across the windings of each phase of the stator and to one of the photo-transistors so that each phase is provided with a plurality of photo-transistors in order to perform the determination of the current direction, thereby flowing the alternating current through the windings to drive the motor; and an electric power source connected in parallel to each phase of said electronic commutator;

wherein the width of the light detecting potion is determined by the following formula:

2p/ the number of poles×(the number of phases×K/the number of phases), wherein K is the commutation coefficient;

the number of the light detecting portions is determined by the following formula:

(the number of poles)/2; and the interval between each of the photo-transistors is determined by the following formula:

2p/(the number of poles)×1/(the number of phases);

whereby the motor is selected from a group consisting of 2-phase with 1-x-exciting, 3-phase with 2-y-exciting, 4-phase with 3-z-exciting. . . n-phase with (n−1−j)-exciting, where x, y, z and j are fractional commutation coefficients, thereby raising the efficiency, power, and speed of the motor.

9. The motor of claim 8, wherein the photo-sensor position of every other photo-sensor in the rotational sequence is moved rotationally to another pole of the same polarity at the same location in that pole as the original pole according to the formula: 4π/(the number of poles), when the motor has insufficient area to properly position all of the photo-sensors.

10. The motor of claim 8, wherein the photo-sensors are arranged in a form of advanced commutation by a given angle in the direction adverse to the rotational direction of the commutation encoder from theoretical position to improve the performance of the motor.

11. The motor of claim 8, wherein the photo-sensor is coupled operatively with the commutation encoder in such a manner that, as occasion demands, the width between the light sensing portion can be adjusted in order to slightly change the width of the sensing area of the light detecting portion in order to modulate the exciting width of the windings and produce a bipolar partial square waveform.

12. The motor of claim 8, wherein the photo-sensor includes a set of photo-transistors for use in a reverse rotation which set is provided in symmetric position separated from the two photo-transistors for use in forward rotation.

13. The motor of claim 8, wherein the N permanent magnet poles are formed by embedded magnets.

14. The motor of claim 8, wherein the commutation encoder is fixed to the rotor shaft outside of the motor and is of cylindrical configuration.

15. A multi-phase bipolar brushless D.C. motor, comprising:

a stator defining M phases, each phase having a plurality of windings connected in parallel and independently of the winding connection of the other phases;

a rotor shaft rotatably coupled to said stator and having N permanent magnet poles formed by embedded magnets which concentrate flux between opposing faces of like polarity;

a cylindrical commutation encoder at one end of the rotor shaft outside of the motor, comprising a circular plate and an annular ring defining at least one light shielding portion which functions as a non-sensing area, and at least one light detecting portion having opposite vertical edges which functions as a sensing area;

photo-sensors coupled operatively with the commutation encoder to provide two photo-transistors for each phase, each of the photo-transistors in the M phases being arranged, in turn, and one by one at intervals of predetermined shaft angle so as to produce a positive pulse when registered with the sensing area of the commutation encoder;

an electronic commutator including four power transistors connected across the windings of each phase of the stator, wherein two of the four power transistors of each phase being connected to one of the photo-transistors so that each phase is provided with two photo-transistors in order to perform the determination of the current direction according to the positive pulse of the photo-transistors, thereby flowing the alternating current through the windings to drive the motor; and an electric power source connected in parallel to each phase of said electronic commutator;

wherein the width of the light detecting potion is determined by the following formula:

2p/ the number of poles×(the number of phases×K/the number of phases), wherein K is the commutation coefficient;

the number of the light detecting portions is determined by the following formula:

(The number of poles)/2; and the interval between each of the photo-transistors is determined by the following formula:

2p/(the number of poles)×1/(the number of phases);

whereby the motor is selected from a group consisting of 2-phase with 1-x-exciting, 3-phase with 2-y-exciting, 4-phase with 3-z-exciting . . . n-phase with (n−1−j)-exciting, where x, y, z and j are fractional commutation coefficients, thereby raising the efficiency, power, and speed of the motor.

16. The motor of claim 15, wherein the photo-sensor position of every other photo-sensor in the rotational sequence is moved rotationally to another pole of the same polarity at the same location in that pole as the original pole according to the formula: 4π/(the number of poles), when the motor has insufficient area to properly position all of the photo-sensors.

17. The motor of claim 15, wherein the photo-sensors are arranged in a form of advanced commutation by a given angle in the direction adverse to the rotational direction of the commutation encoder from theoretical position to improve the performance of the motor, wherein the photo-sensor is coupled operatively with the commutation encoder in such a manner that, as occasion demands, the width between the light sensing portion can be adjusted in order to slightly change the width of the sensing area of the light detecting portion in order to modulate the exciting width of the windings and produce a bipolar partial square waveform, and wherein the photo-sensor includes a set of photo-transistors for use in a reverse rotation which set is provided in symmetric position separated from the two photo-transistors for use in forward rotation.

\* \* \* \* \*